US008928964B1

United States Patent
Sternowski

(10) Patent No.: US 8,928,964 B1
(45) Date of Patent: Jan. 6, 2015

(54) THREE-DIMENSIONAL IMAGE DISPLAY

(71) Applicant: Robert Sternowski, Cedar Rapids, IA (US)

(72) Inventor: Robert Sternowski, Cedar Rapids, IA (US)

(73) Assignee: Softronics, Ltd., Marion, IA (US)

(*) Notice: Subject to any disclaimer, the term of this patent is extended or adjusted under 35 U.S.C. 154(b) by 28 days.

(21) Appl. No.: 13/749,965

(22) Filed: Jan. 25, 2013

Related U.S. Application Data

(60) Provisional application No. 61/592,360, filed on Jan. 30, 2012.

(51) Int. Cl.
| | |
|---|---|
| *G02B 26/00* | (2006.01) |
| *G02B 27/22* | (2006.01) |
| *F21V 14/02* | (2006.01) |
| *G02F 1/01* | (2006.01) |

(52) U.S. Cl.
CPC .............. *G02B 27/22* (2013.01); *F21V 14/02* (2013.01); *G02F 1/01* (2013.01)
USPC .......................................... 359/238; 359/464

(58) Field of Classification Search
CPC ............... G02B 27/22; G02B 27/2214; G02B 27/2235; G02B 27/2242; G02B 27/2285; B44F 7/00; G09G 3/007
USPC ............... 359/23, 238, 458, 462–477; 345/6; 348/42, 51, 54–60
See application file for complete search history.

(56) References Cited

U.S. PATENT DOCUMENTS

| | | |
|---|---|---|
| 6,344,837 B1 | 2/2002 | Gelsey |
| 7,978,407 B1 | 7/2011 | Connor |
| 2008/0309663 A1 | 12/2008 | Fukushima et al. |
| 2011/0032365 A1* | 2/2011 | Yett ............................ 348/207.1 |

* cited by examiner

*Primary Examiner* — Mahidere Sahle
(74) *Attorney, Agent, or Firm* — Jason R. Sytsma; Shuttleworth & Ingersoll, PLC

(57) ABSTRACT

An image display to provide a realistic 3D stereoscopic image of a desired scene. The display device is comprised of directional pixels. Each directional pixel has a plurality of facets having a constrained viewing angle. Each facet has a point source of light that emits light with a controllable luminescence and hue. In this regard, each facet of the directional pixel has a constrained viewing angle and independent luminance and hue.

33 Claims, 13 Drawing Sheets

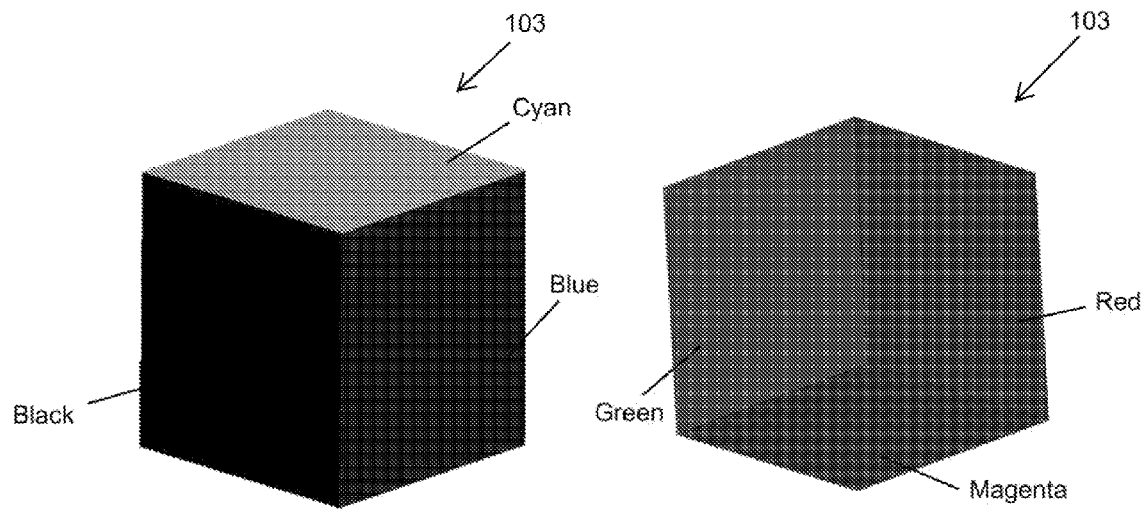
Fig 3
Fig 4
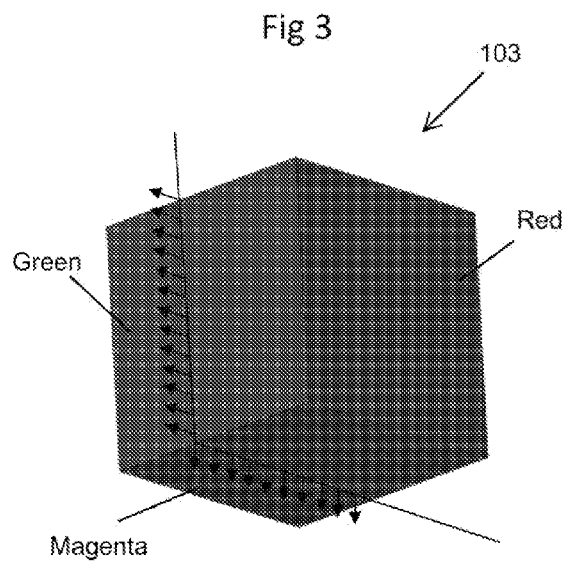
Fig 5
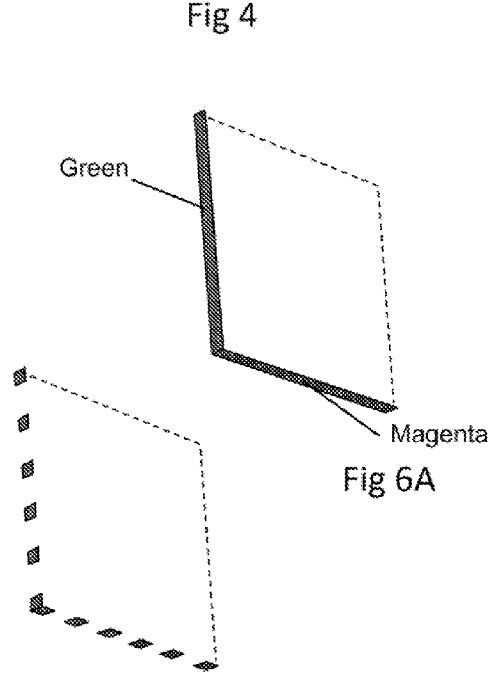
Fig 6A
Fig 6B

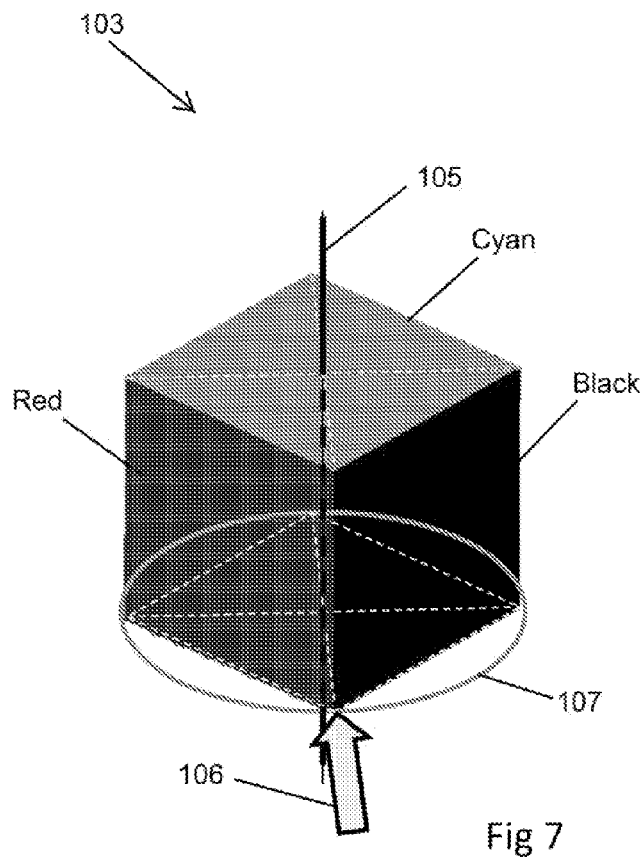
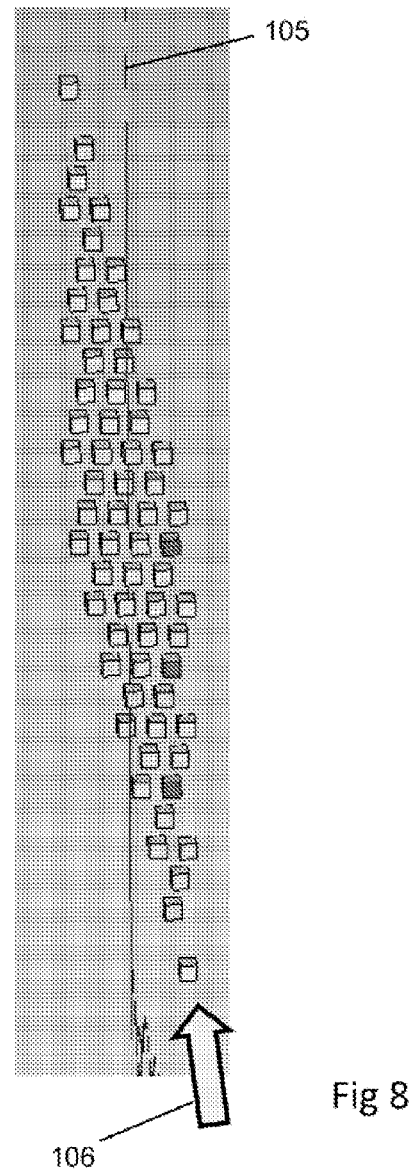
Fig 7
Fig 8

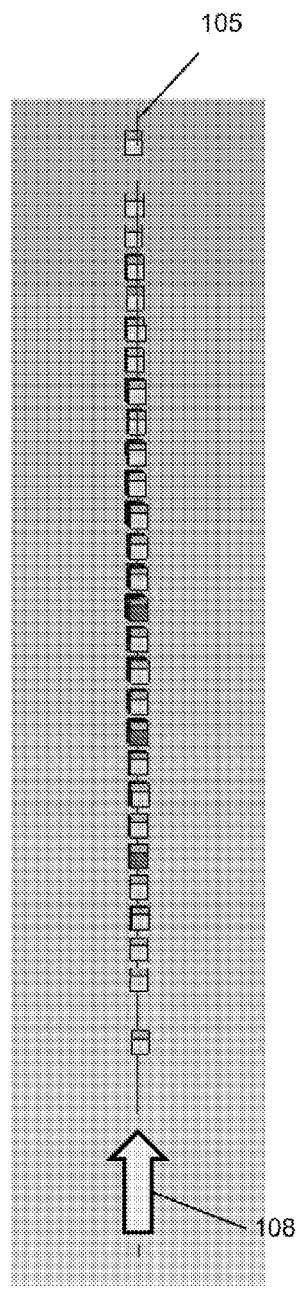
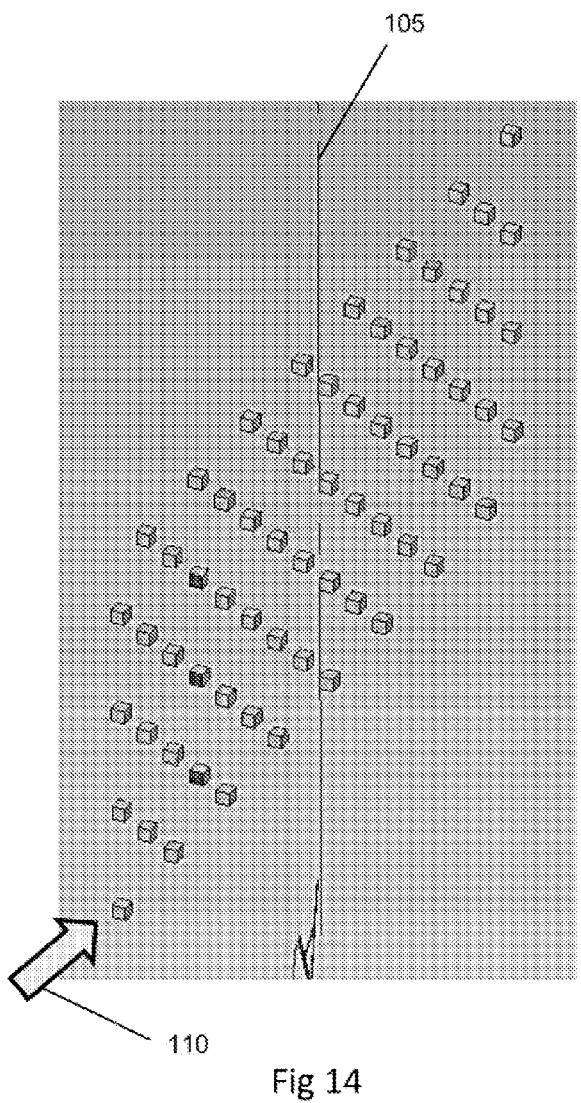
Fig 12
Fig 14

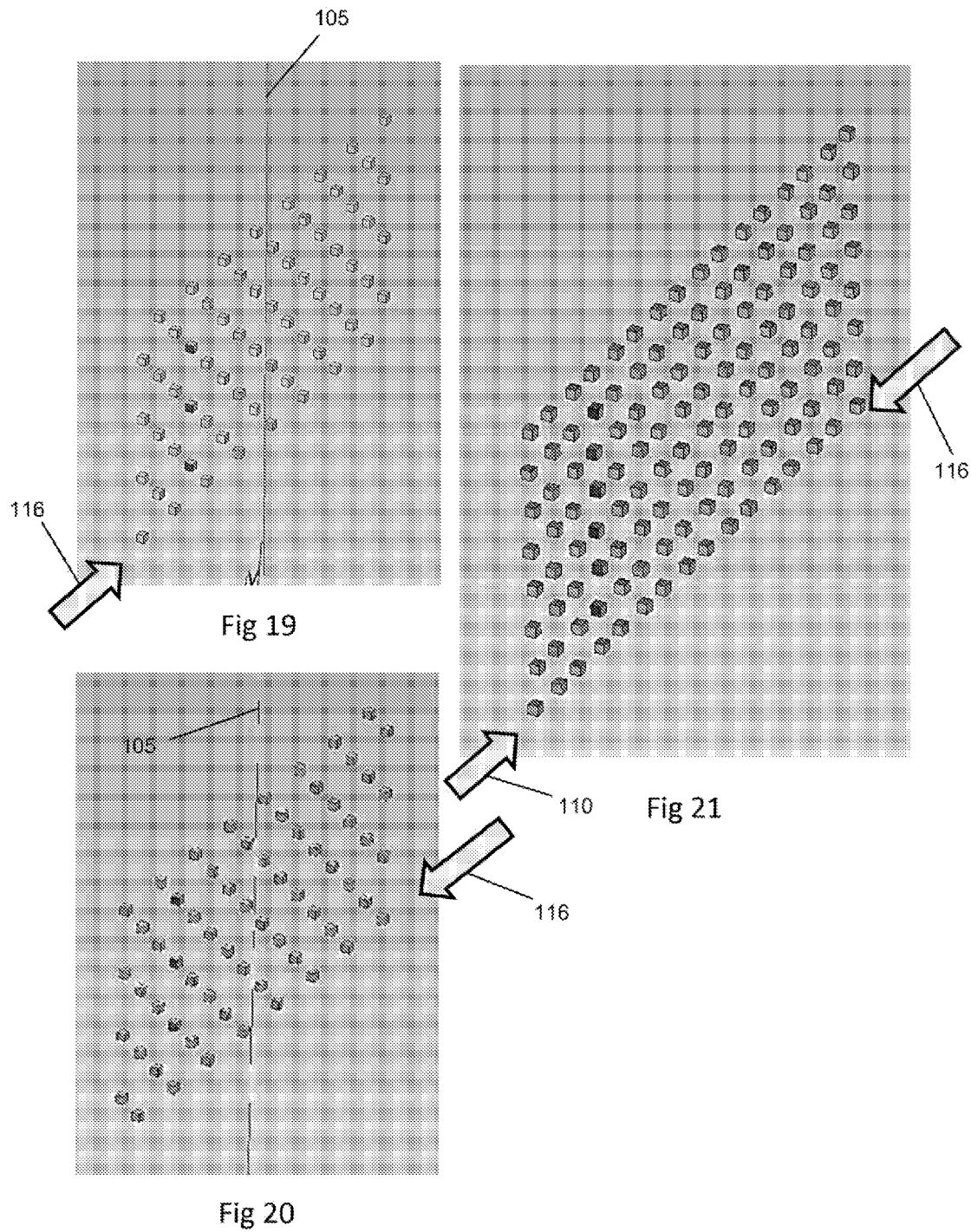

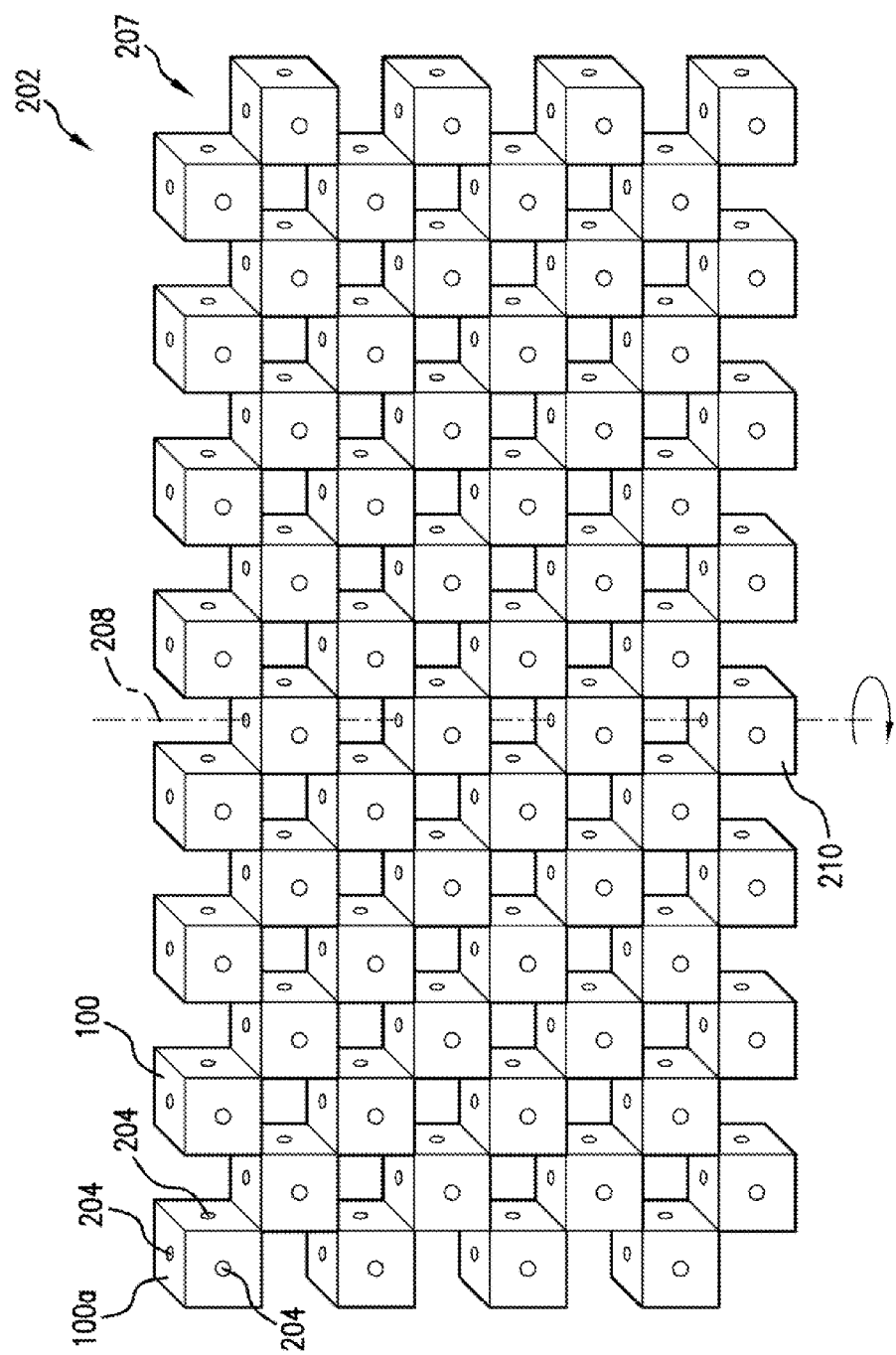

THREE-DIMENSIONAL IMAGE DISPLAY

This application claims priority to U.S. Provisional Patent Application 61/592,360 filed Jan. 30, 2012, which application is incorporated by reference herein.

FIELD OF THE INVENTION

The present invention relates generally to image display devices, and more particularly to three-dimensional image display devices.

BACKGROUND OF THE INVENTION

Creating the illusion of three-dimensional (3D) images on a display device or projection screen has been attempted for many years. In the 1950s, 3D movies were popular with polarized glasses worn to separate images for the left and right eye to provide for a stereoscopic view of the movie. Another area in which 3D imagery has been attempted is on raster scan displays. Generally, when the term 3D is used in regard to computer graphics, the term is referring to planar generated 3D images that are created using geometric perspective and projection transformations and other monocular depth cues such as hidden line removal, surface modeling, shading, texture mapping, and rotation. These techniques are appropriate for computer games and CAD application software but only provide the illusion of a 3D display because the scene is shown on a 2D display.

Stereoscopic images present the viewer with slightly different perspectives for the left and right eyes which fuse together to provide a sense of depth, in a process called stereopsis. Stereoscopic displays typically require the use of some device worn by the viewer to separate the left and right eye perspectives. Autostereoscopic displays make use of some device externally attached to the 3D display to generate the left and right views without the aid of a special viewing aid worn by the viewer. Again, this technology only provides the illusion of a 3D display because the scene is still shown on a 2D display.

A true 3D display would have two qualities: First, a true 3D display would allow several observers looking at the same scene to simultaneously see different parts of the objects in the scene and may even see somewhat different sets of objects. An additional property of such a real 3D scene is that an observer with two eyes will see slightly different views of the scene from each eye, and the brain will use these differences to create a perception of the distance between the objects and the observer. Second, a true 3D display would allow the observer to move around the display and view the scene from any position, including the front, back, top, bottom, and any of the sides. In this regard, a true 3D display would be 3D.

SUMMARY

According to the present invention, there is provided an image display to provide a realistic 3D image of a desired scene. The display device is comprised of directional pixels. Each directional pixel has a plurality of facets having a constrained viewing angle. Each facet has a point source of light that emits light with a controllable luminescence and hue. In this regard, each facet of the directional pixel has a constrained viewing angle and independent luminance, and hue. In an embodiment, each facet has independent polarization.

The directional pixels display light from a volume so that the scene can be viewed from any angle (both in elevation and azimuth) around the display device. In one embodiment, the directional pixels are arranged in a three-dimensional array having a height, width, and depth. In another embodiment, the directional pixels are arranged in a two-dimensional array which is moved to create the appearance of a third dimension.

In an embodiment, the directional pixels are interlaced with spaces. Interlacing spaces between each directional pixel permits each directional pixel to display light in all three dimensions and minimizes occlusion from a directional pixel that is in front of another directional pixel. The ratio of interlacing spaces to directional pixels can be any value, but the greater the ratio of spaces to directional pixels, the less occlusion there is.

Other features and aspects of the invention will become apparent upon review of the following description taken in connection with the accompanying drawings. The invention, though, is pointed out with particularity by the appended claims.

BRIEF DESCRIPTION OF THE DRAWINGS

FIG. 3 is a 3D image of a cube with each face a different color.

FIG. 4 is the 3D image of the cube of FIG. 3 rotated to show the hidden faces.

FIG. 5 is the 3D image of the cube of FIG. 3 with a locus of points normal to the surface along a plane extending through the cube.

FIG. 6A is a slice taken from the cube of FIG. 5 along the plane.

FIG. 6B is a dot-matrix approximation of surfaces that would need to be illuminated to generate the slice of the cube shown in FIG. 6A.

FIG. 7 is a 3D image of a cube with each face a different color.

FIG. 8 is an array of directional pixels showing the illuminated facets that correspond to a slice taken from the cube of FIG. 7.

FIG. 12 is an array of directional pixels showing the illuminated facets that correspond to the slice taken from the index position shown in FIG. 11.

FIG. 14 is an array of directional pixels showing the illuminated facets that correspond to the slice taken from the index position shown in FIG. 13.

FIG. 19 is the array of directional pixels shown in FIG. 14.

FIG. 20 is an array of directional pixels showing the illuminated facets that correspond to the slice taken from an index position rotated 180-degrees from the index position shown in FIG. 13.

FIG. 21 is the array of directional pixels shown in FIG. 19 combined with the array of directional pixels shown in FIG. 20 with the corresponding index positions 180-degrees apart.

FIG. 27 is a display device comprising a 4×8 array of directional pixels that are separated by a volume the size of a directional pixel and rotatable about a vertical axis to generate a 3D volumetric display that is perceived as an 8×16 array.

DETAILED DESCRIPTION

The present invention is directed toward a true three-dimensional (3D) display for displaying a true 3D image of an object or scene.

This disclosure uses the term "observer" and "reader". An observer represents a person who can move 360° around (both in elevation and azimuth) the object or scene, while the reader represents the person reading this disclosure and viewing the figures from the illustrative perspective.

A scene, from the perspective of the observer, is composed of surfaces, which can be a field of incrementally small contiguous sub-surfaces that each corresponds to the observer's angular position. As an observer moves 360° around (both in elevation and azimuth) the object or scene, the sequence of surfaces varies in a potentially complex manner. The observer will always see the topmost surface with respect to the observer's current position for each angular increment of the observer's field of view. There can be nothing obstructing the observer's view of the surface nor can the surface be completely transparent. The surface has some measure of opacity, which is the degree to which light is not allowed to travel through the surface. The observer judges the distance to the surface by the stereoscopic imaging of the brain from the two retinal images.

Figure 1:
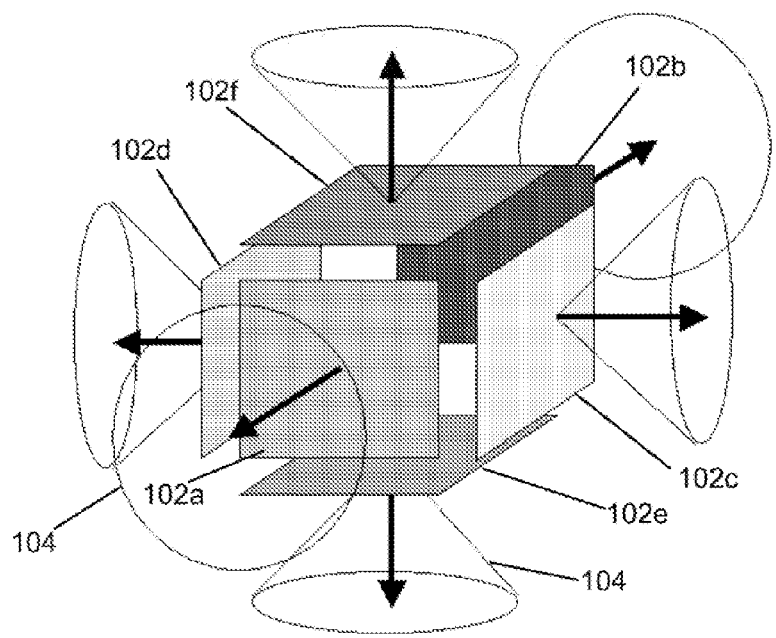
FIG. 1 is an embodiment of a multi-faceted directional pixel.

The sub-surfaces that compose the surface are directional. Directionality refers to that portion of a surface that is viewable only within a defined viewing cone that is orthogonal to the center of the sub-surface. FIG. 1 shows a cube 100 comprised of six surfaces 102(a-f). Each surface 102(a-f) is comprised of a series of sub-surfaces, and with respect to an observer's position, each sub-surface is the portion of surface 102(a-f) that is viewable within the defined viewing cone 104. The further the observer is from surface 102(a-f), the more of surface 102(a-f) the observer will see and, conversely, the closer the observer is to surface 102(a-f), the less of surface 102(a-f) the observer will see.

Each sub-surface that the observer perceives is based on the position of the observer with respect to surface 102(a-f) and its luminance and hue. Luminance is the measure of light that passes through or is emitted from the sub-surface, and can be characterized as the emission or reflection from the sub-surface. Hue is one of the main properties of color, and refers to the degree to which a stimulus can be described as similar to or different from stimuli that are described as red, green, blue, and yellow. The smallest perceptible element that the observer can perceive is a pixel. With respect to a display device, the pixel is the smallest unit on the screen that can be manipulated. In this regard, this disclosure is directed toward a pixel with directionality.

Cube 100 of FIG. 1 will now be referred to as a directional pixel 100 with each surface 102(a-f) represented as a facet 102(a-f). The directional pixel 100 can have any geometric configuration comprised with any number of individual facets corresponding to resolution and smoothness of the displayed surface, and limited only by manufacturing capability.

Each facet 102(a-f) of directional pixel 100 has a constrained viewing angle and independent luminance, hue, and polarization. A display device, discussed below, comprises an array of such directional pixels 100. Each directional pixel 100 represents an object by directing light emissions orthogonal to each of directional pixel's 100 representation of the surface. Thus, directional pixel 100 for surfaces behind the nearest surface will emit no light toward the observer, and therefore, rather than generating an opaque surface, facet 102(a-f) of directional pixel 100 emits no light from hidden surfaces.

Figure 2A:
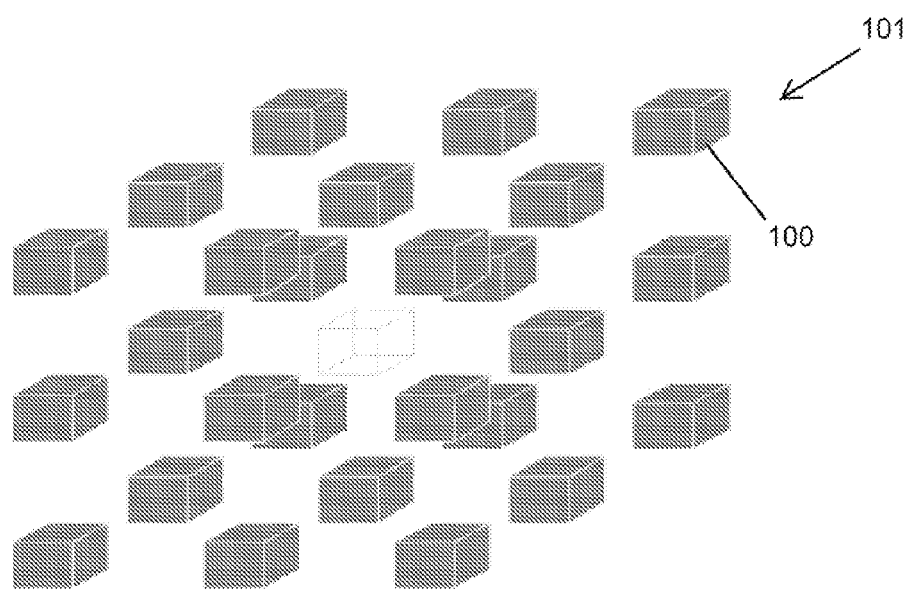
FIG. 2A is a 3×3×3 array of the directional pixel of FIG. 1 with all of the facets on each directional pixel illuminated in order to represent a 3D image of a cube.
Figure 2B:
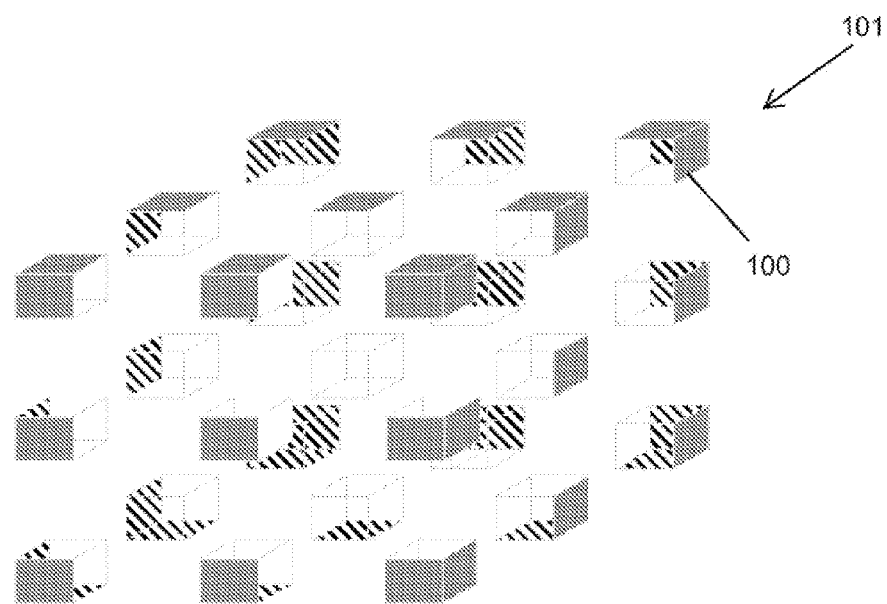
FIG. 2B is the 3×3×3 array of the directional pixels of FIG. 2 with only the facets necessary to represent the 3D image of the cube illuminated.
Figure 2C:
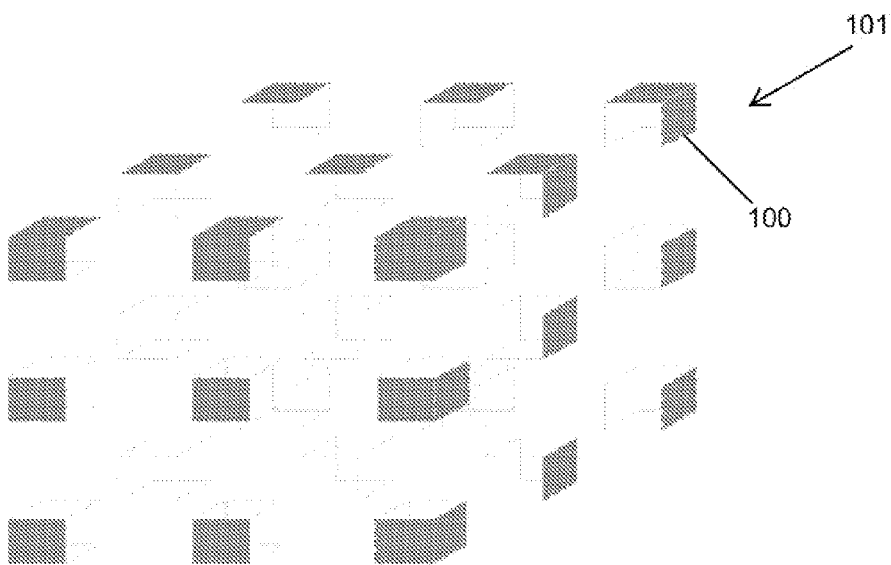
FIG. 2C is the 3×3×3 array of the directional pixels of FIG. 2 with only the facets that would be visible to an observer necessary to represent the 3D image of the cube illuminated.

FIG. 2 shows a comparison between different display methods for a simple 3D object, a cube. The cube is shown on a 3×3×3 array 101 of directional pixels 100. FIG. 2A shows all of facets 102(a-f) of each directional pixel 100 in the array 101 emitting light. From the reader's perspective, a crude representation of a cube can be seen. However, the cube becomes more apparent to the reader when facets 102(a-f) that do not correspond to a surface of the cube are turned off. FIG. 2B shows facets 102(a-f) of each directional pixel 100 in array 101 emitting light only when the particular facet 102(a-f) corresponds in position to a surface of the cube that would be visible to the observer. The illuminated facets that would be hidden from view, from the reader's perspective, are shown with cross-hatching. FIG. 2C shows facets 102(a-f) of each directional pixel 100 in array 101 emitting light only when the particular facet would be viewable from the perspective of the observer. It is apparent that array 101 of six-faceted 102(a-f) directional pixels 100 can provide a reasonable representation of a true 3D image of a cube.

FIG. 2 shows a 3×3×3 array 101 of directional pixels 100, which creates a volumetric display of an image that has a height, width, and depth axis (x,y,z). An alternative embodiment hereafter disclosed is a 3×3 array with the third axis being created by physically moving the 3×3 array. This can be done in any manner, such as oscillating the array back and forth in a linear or rotating motion or by dithering the array in a pseudo-random manner.

Flicker greater than 20 frames per second is generally imperceptible to the human eye, which means that physical movement of the 3×3 array can be greater than or equal to 20 cycles per second (or any range therebetween) and the 3×3 array will appear to have volume (30 cycles per second is preferred because it is one-half the line frequency making it easy to synchronize). However, there may be some edge artifacts on the display that appear as black lines running the vertical length of the display due to the physical nature of each directional pixel 100. Dithering the motion of the array can remove these edge artifacts in the display.

FIGS. 3-25 represent a simplistic illustrative example of how to take a 3D image of an object or scene, which is a cube 103 in the illustrative example and is shown in FIGS. 3 and 4, and present it on a display device comprised of an array of directional pixels 100 (an example of an array of directional pixels 100 arranged on a display device 202 is shown in FIG. 27). Together, FIGS. 3 and 4 show all six sides of cube 103 that is to be digitized and recreated and shown on display device 202. Each face of cube 103 is a different color for ease of representation. Those colors are black, blue, cyan (shown in FIG. 3) and green, red, and magenta (shown in FIG. 4).

The image of cube 103 is digitized into an array of dots represented by direction, hue, and intensity. The variable of directionality on a 3D directional pixel 100 differentiates directional pixel 100 from all other known pixel arrangements and presents to the observer a true stereoscopic display with true depth—not the mere illusion of depth.

Once each dot is quantized, these dots can be depicted on facets 102(a-f) of each directional pixel 100 in the display device with the appropriate facet 102(a-f) illuminated to represent the image from the perspective of the observer. This means that an observer looking at cube 103 in FIG. 3 from the reader's perspective will see different colored faces than an observer looking from the other side of cube 103.

Cube 103 is deconstructed into incremental units corresponding to the number of directional pixels 100 in the array. This is done by "slicing" cube 103 with a plane of an orientation suitable for the implementation of the array of directional pixels 100. FIG. 5 shows cube 103 sliced vertically. Along the line formed wherever the plane intersects cube 103, there is a locus of points that must be illuminated by directional pixels 100. The number of points in the locus would correspond to the resolution of display devices 202.

With respect to the green and magenta sides, an array of directional pixels 100 must light their corresponding facets 102(a-f) to produce the rows of green and magenta, shown in FIG. 6A. The light emanating from cube 103 is directionality oriented orthogonal to the surfaces of cube 103. The arrows indicate the direction of the light required to emanate from directional pixels 100 in order to display cube 103. The color intensity is an arbitrary value, and thus, the three properties necessary for each directional pixel 100, direction, hue, and intensity, are given.

FIG. 6B shows the sliver deconstructed into an approximation of facets 102(a-f) on directional pixels 100 that need to be illuminated. From the foregoing, it can be seen how a 3D object, such as cube 103 can be deconstructed and quantized as an array of dots represented by direction, hue, and intensity. FIGS. 7-21 show how the quantized dots shown in 6B can be reconstructed and displayed on a rotating 8×16 directional pixel array. For the illustrative example, cube 103 will be digitized with a 6×12 directional pixel resolution in ten-degree increments.

FIGS. 22 and 23 and FIGS. 24 and 25 juxtapose cube 103 with its representation on the rotating 8×16 directional pixel 100 array. The 8×16 array of directional pixels 100 is simulated with a 4×8 array of directional pixels 100 with a space between each directional pixel 100, as shown in FIG. 27. The rotation of the 4×8 array greater than or equal to 30 cycles per second gives the illusion of an 8×16 array. Furthermore, interlacing spaces between each directional pixel permits each directional pixel 100 to display light in all three dimensions and minimizes occlusion from a directional pixel 100 that is in front of another directional pixel 100. The ratio of interlacing spaces to directional pixels 100 can be any value, but the greater the ratio of spaces to directional pixels 100, the less occlusion there is.

A commercial embodiment of a display device comprising directional pixels 100 would have thousands of directional pixels 100. Each directional pixel 100 has a direction, hue, and intensity, meaning that a commercial display device requires an enormous amount of data to control all of the directional pixels 100. One way of reducing the amount of data is to recognize that based on the sampling rate, i.e. the number of slices used to deconstruct the image, which is thirty-six in the illustrated embodiment, and the absolute width of the directional pixel 100 some of facets 102(a-f) will appear to overlap. This means that instead of illuminating each facet 102(a-f) according to how the object was sampled, some of the facets 102(a-f) can be illuminated at a lower frequency, and still give the impression that the rotating array of directional pixels 100 is a solid volume. This explains, for example, why in FIG. 12 that only three red faces are illuminated when there might otherwise need to be six red faces illuminated. This processing method reduces the amount of data required, and is important to keep in mind while examining FIGS. 12, 14, 16, 18-21, 23 and 25.

Figure 22:
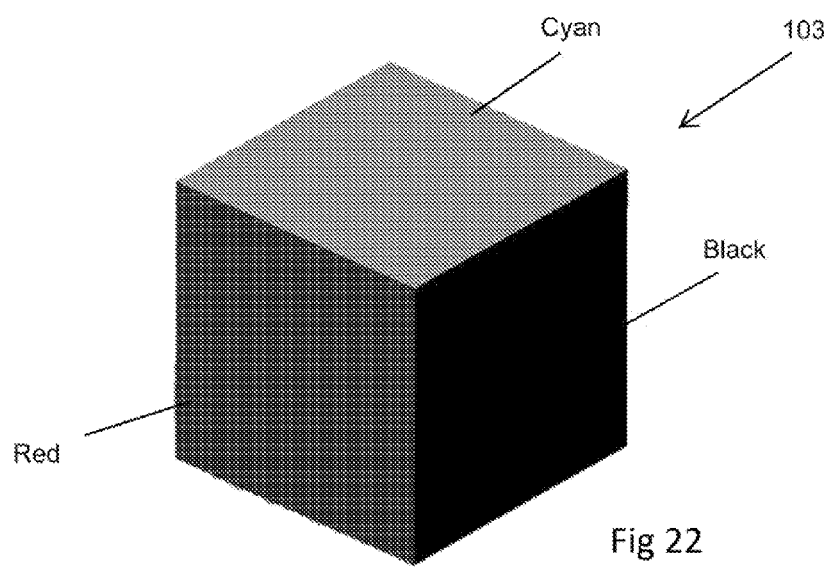
FIG. 22 is the cube shown in FIG. 7.
Figure 23:
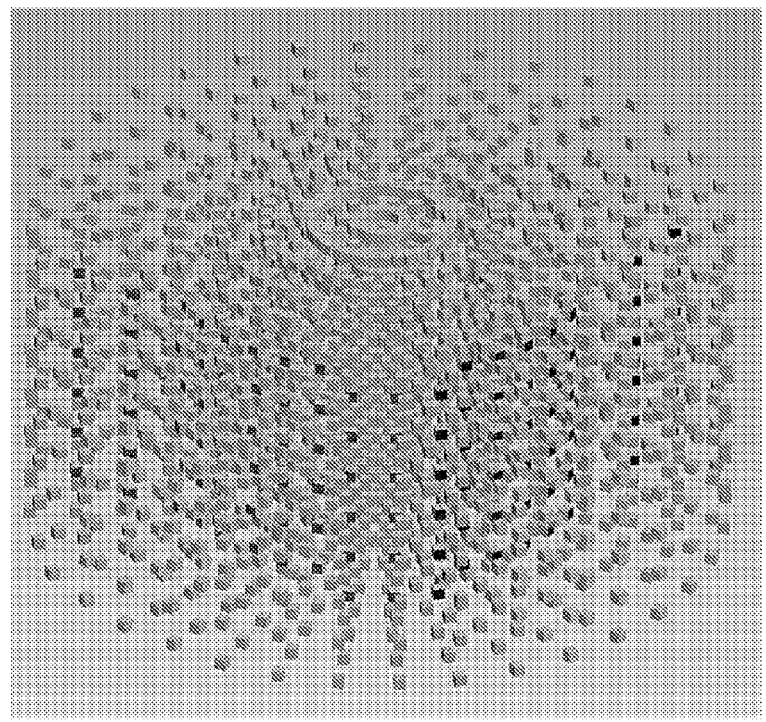
FIG. 23 is a summation of the arrays of directional pixels with each array representing a slice taken at 10-degree increments around the cube that is shown in FIG. 22.
Figure 24:
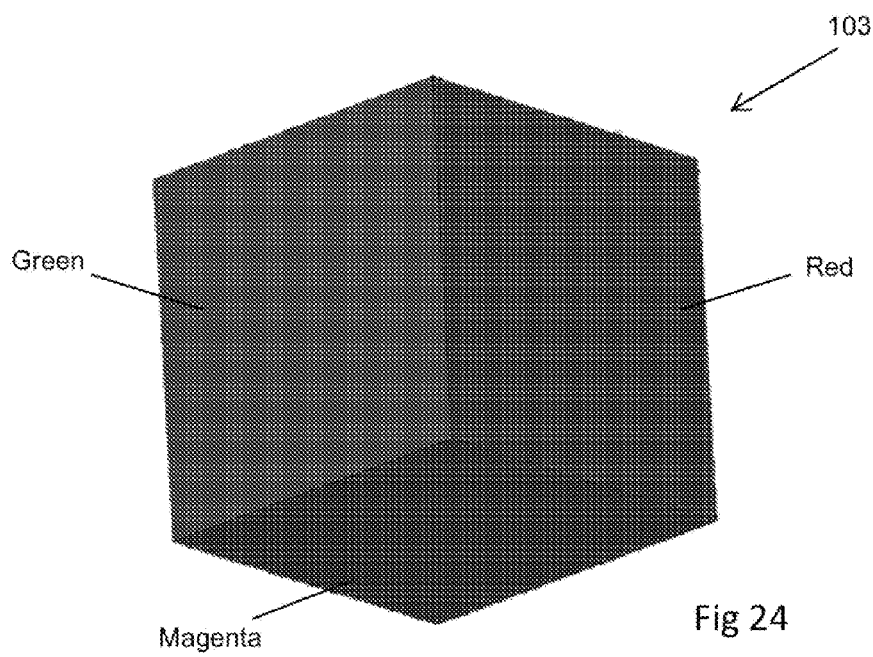
FIG. 24 is the cube shown in FIG. 7 rotated to show the hidden faces.
Figure 25:
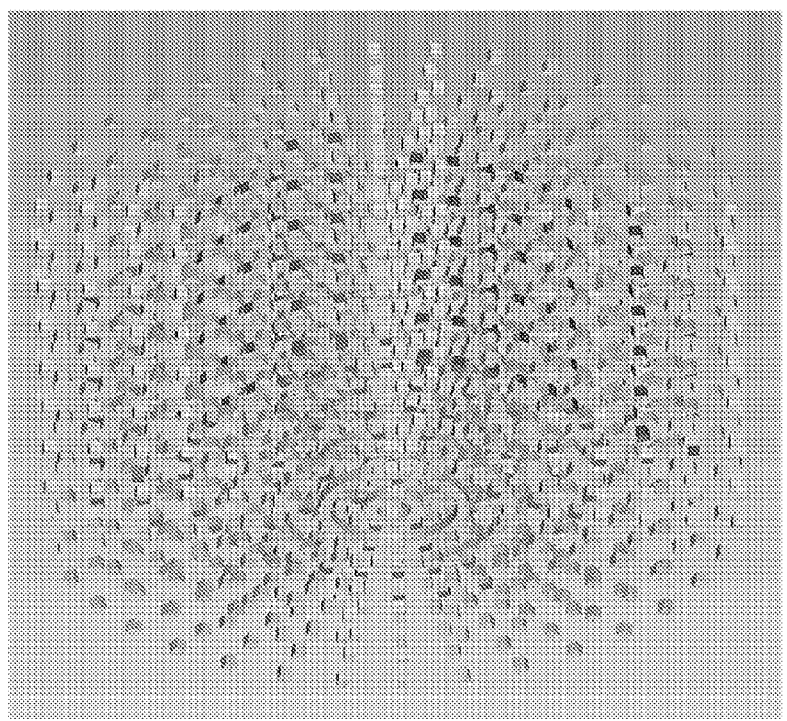
FIG. 25 is a summation of the arrays of directional pixels with each array representing a slice taken at 10-degree increments around the cube that is shown in FIG. 24.
Figure 26:
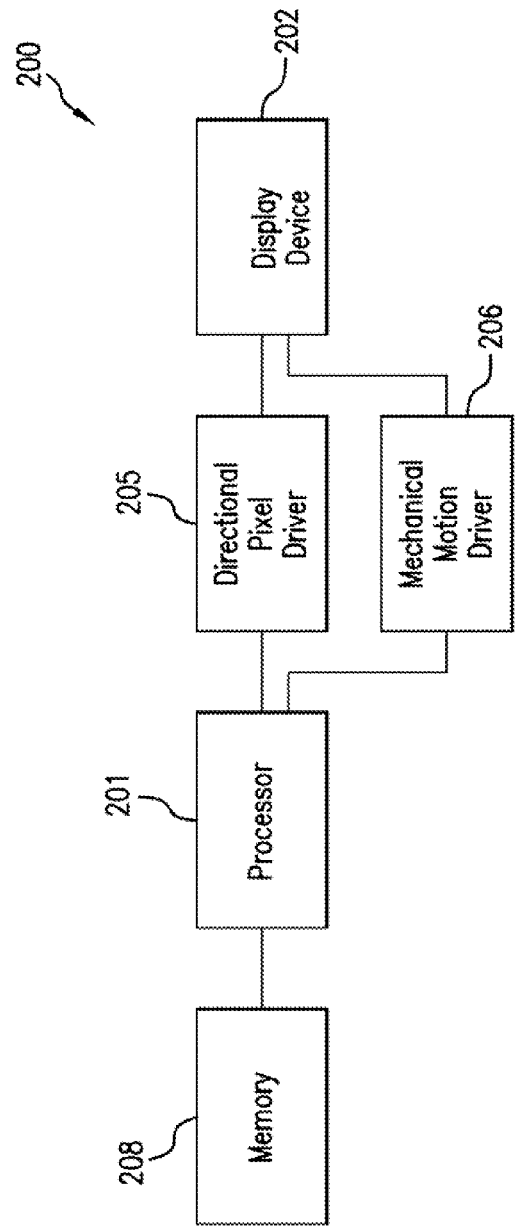
FIG. 26 is a block diagram for a system, including a display device comprising a plurality of directional pixels.

FIG. 22 shows cube 103 oriented with the cyan, red, and black faces visible to the reader. FIG. 23 shows the rotating 8×16 directional pixel 100 array displaying a 6×12 image of cube 103 from the orientation shown in FIG. 22. FIG. 24 shows cube 103 oriented with the green, red, and magenta faces visible to the reader. FIG. 25 shows the rotating 8×16 directional pixel 100 array displaying a 6×12 image of the cube 103 from the orientation shown in FIG. 24.

FIG. 7 shows a 3D image of cube 103 which will be quantized and displayed as shown in FIGS. 23 and 25. Cube 103 is digitized into thirty-six slices in ten-degree increments about a vertical axis 105. A circle 107 shows the rotational locus of cube 103. The first slice is taken at a location indicated by an arrow 106. Arrow 106 is used to show the relative view angle of the slice in subsequent figures.

FIG. 8 shows the first slice extracted from cube 103. Arrow 106 shows the relative view angle of the first slice with respect to cube 103. Each slice is represented by illuminating alternating directional pixels 100. As the 8×16 directional pixel 100 array is rotated, each directional pixel 100 will flash its corresponding facet 102(a-f) every half-rotation (180 degrees). In this regard, each slice has a complementary slice that is taken 180-degrees around cube 103; for example, slice 19 is complementary to slice 1. FIG. 8 shows a row of directional pixels 100 illuminating a red face in the vertical direction and a row of directional pixels 100 illuminating a cyan face in the horizontal direction.

Figure 9:
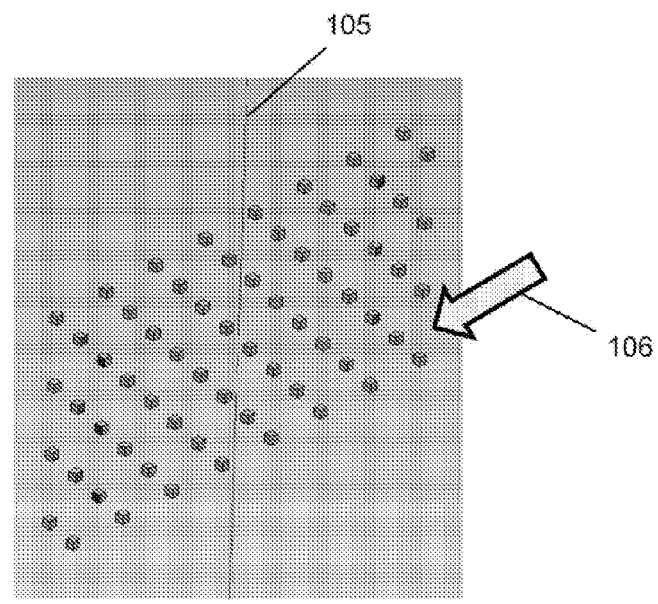
FIG. 9 is the array of directional pixels of FIG. 8 rotated to show the top facets that are illuminated with a cyan coloration.
Figure 10:
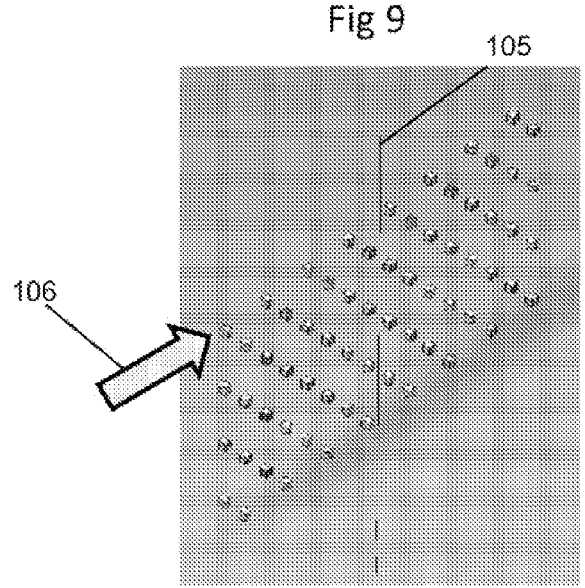
FIG. 10 is the array of directional pixels of FIG. 8 turned upside down to show the bottom facets that are illuminated with a magenta coloration.

FIG. 9 shows the first slice rotated and viewed from the direction of an observer looking down on the top, cyan face of cube 103 to show the top facet 102(a-f) of directional pixels 100 illuminating a cyan color. From this orientation, the observer could also see facets 102(a-f) illuminating a blue face and other facets 102(a-f) illuminating a green face. FIG.

10 shows slice 1 turned upside down to show the bottom facets 102(*a-f*) of directional pixel 100 illuminating a magenta color corresponding to the bottom magenta-face of the cube 103. Arrow 106 shows the relative index position in each of FIGS. 7-10.

Figure 11:
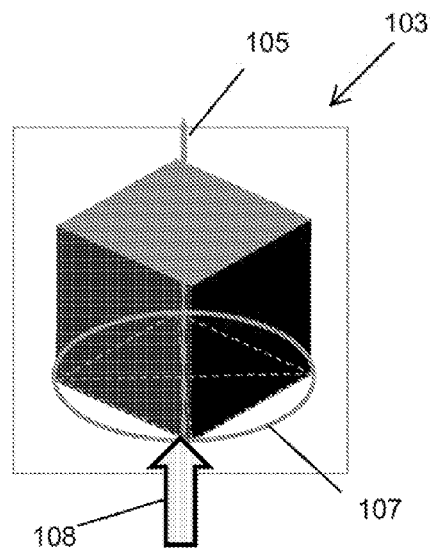
FIG. 11 is the 3D image of the cube of FIG. 7 showing a location for a slice of the cube taken at an index position shifted ten degrees clockwise.

FIGS. 11-18 show how the different facets 102(*a-f*) of corresponding directional pixels 100 are illuminated as the angle of the slice is moved in ten-degree increments around cube 103. FIG. 11 shows the second slice, which is rotated ten-degrees in the clockwise direction from the first slice. An arrow 108 shows the relative view angle of the location for the second slice with respect to cube 103. FIG. 12 shows the second slice as represented by directional pixels 100.

Figure 13:
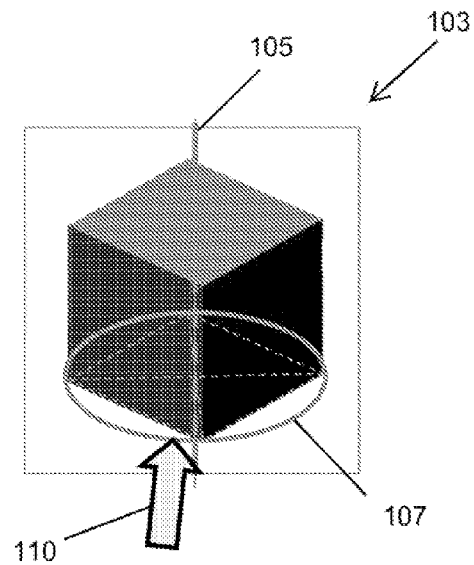
FIG. 13 is the 3D image of the cube of FIG. 7 showing a location for a slice of the cube taken at an index position shifted ten degrees clockwise from the location shown in FIG. 11.

FIG. 13 shows the third slice, which is taken ten-degrees in the clockwise direction from the second slice. An arrow 110 shows the relative view angle of the location for the third slice with respect to cube 103. FIG. 14 shows the third slice represented by directional pixels 100.

Figures 15, 17:
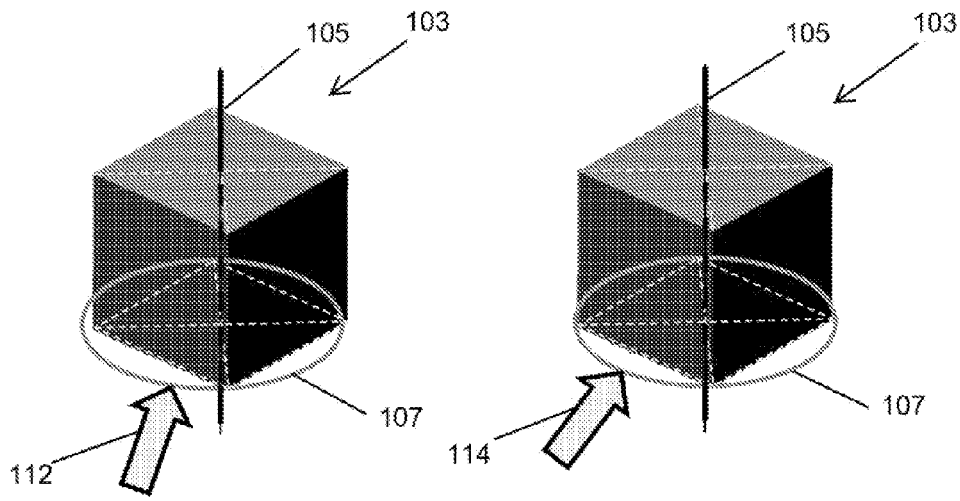
FIG. 15 is the 3D image of the cube of FIG. 7 showing a location for a slice of the cube taken at an index position shifted ten degrees clockwise from the location shown in FIG. 13.
FIG. 17 is the 3D image of the cube of FIG. 7 showing a location for a slice of the cube taken at an index position shifted ten degrees clockwise from the location shown in FIG. 15.
Figure 16:
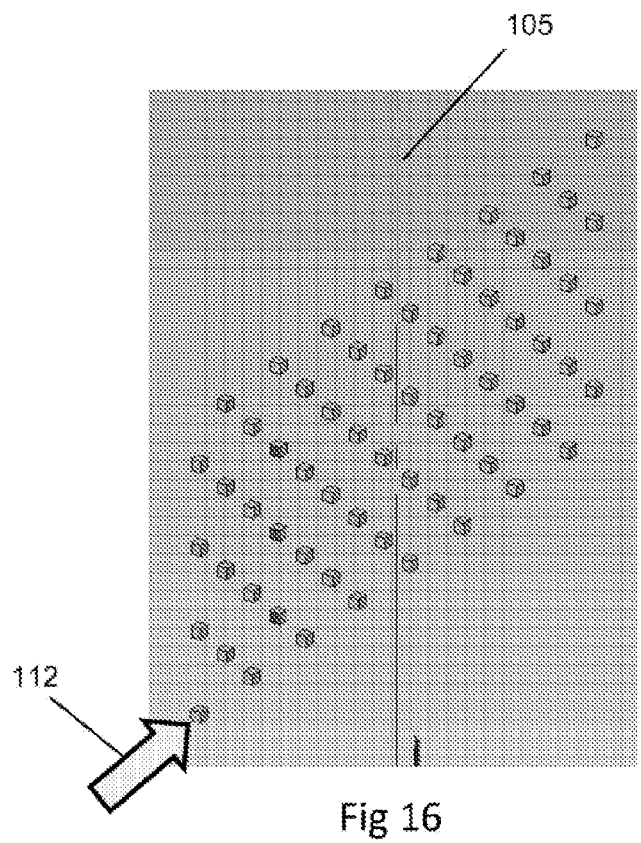
FIG. 16 is an array of directional pixels showing the illuminated facets that correspond to the slice taken from the index position shown in FIG. 15.

FIG. 15 shows the fourth slice, which is taken ten-degrees in the clockwise direction from the third slice. An arrow 112 shows the relative view angle of the location for the third slice with respect to cube 103. FIG. 16 shows the fourth slice represented by directional pixels 100.

Figure 18:
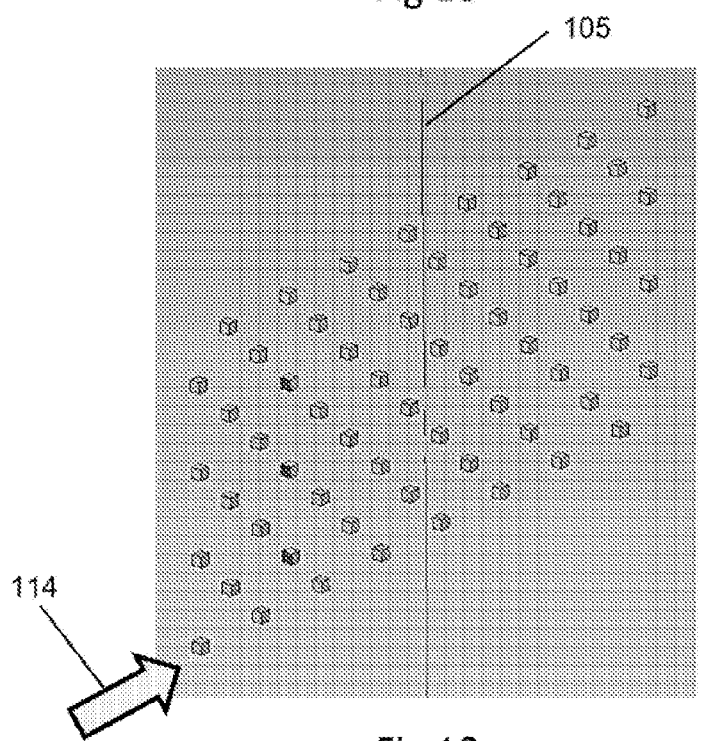
FIG. 18 is an array of directional pixels showing the illuminated facets that correspond to the slice taken from the index position shown in FIG. 15.

FIG. 17 shows the fifth slice, which is taken ten-degrees in the clockwise direction from the fourth slice. An arrow 114 shows the relative view angle of the location for the fifth slice with respect to cube 103. FIG. 18 shows the fifth slice represented by directional pixels 100.

FIGS. 19-21 show how 180-degree complementary slices are combined together to create a single, full slice of cube 103. FIG. 19 shows the third slice, and FIG. 20 shows its complementary slice, the twenty-first slice. Arrow 110 shows the relative index position of the third slice, and an arrow 116 shows the relative index position of the twenty-first slice.

FIG. 21 shows a full slice of cube 103 created by combining the third and twenty-first slices. A vertical row of six red faces and a horizontal row of six cyan faces are illuminated (keep in mind that rather than illuminating twelve facets 102(*a-f*) to show twelve cyan faces the facets 102(*a-f*) that appear to overlap are illuminated less frequently, which is why only six cyan illuminated facets 102(*a-f*) are visible). The spaces 118 between the red faces and the cyan faces in the third slice, shown in FIG. 19, are filled in by the red faces and the cyan faces of the twenty-first slice. Interleaving the complementary directional pixels 100 from slices three and twenty-one gives the illusion of a solid surface.

When all of the complementary slices are interleaved, the rotating 8×16 directional pixel 100 array appears as a solid volume to the observer. This can be seen in FIGS. 22 and 23 and FIGS. 24 and 25, which juxtapose cube 103 with its representation on the rotating 8×16 directional pixel 100 array. FIG. 22 shows the cube 103 oriented with the cyan, red, and black faces visible. FIG. 23 shows the rotating 8×16 directional pixel 100 array displaying a 6×12 image of cube 103 from the reader's perspective shown in FIG. 22. FIG. 24 shows cube 103 oriented with the green, red, and magenta faces visible. FIG. 25 shows the rotating 8×16 directional pixel 100 array displaying a 6×12 image of cube 103 from the reader's perspective shown in FIG. 24.

FIG. 27 shows a display device 202 comprising a 4×8 array of directional pixels 100. Each facet 102(*a-f*) of each directional pixel 100 is made with circuit boards appropriately joined together to create facets 102(*a-f*). Each facet 102(*a-f*) of each directional pixel 100 has a point source of light 204. In the illustrated embodiments, point source of light 204 is generated by a surface-mounted light-emitting diode (LED). Each facet 102(*a-f*) has mounted thereon an LED package that comes with three LEDs emitting red, green, and blue, respectively, so that when appropriately energized the LEDs produce in combination a substantially full range of colors.

The directional pixels 100 are interlaced in a 4×8 array with a space between each adjacent directional pixel 100. Each space has the same dimensions as each directional pixel 100. When display device 202 is rotating the spaces will be filled in by the opposite directional pixel each half-cycle. In other words, the top right directional pixel 100*a* in FIG. 27 will fill in a space 207 in the top left corner of display device 200, for example. If display device 202 is rotating greater than or equal to 20 cycles per second, the observer will have the illusion of seeing an 8×16 array.

Each directional pixel 100 can be driven by as few as nine wires, three color wires one for each of the red, blue, and green, LEDs in the LED package with the relative intensity of each variable, and six wires corresponding to each facet 102 (*a-f*) to turn on and off each facet 102(*a-f*). Extending through the center of display device 202 is an axis 208. Axis 208 is the center of rotation for display device 202, and is driven by a motor. This may mean that the directional pixels 100 that find themselves positioned where the rotational axis extends may need to be modified so that the axis extends through the directional pixel 100, and an LED package is positioned on an opposite side of the axis.

A controller having a processor 201, which can also be a central processing unit, microprocessor, or computer, controls a directional pixel driver 205 that provides individual control voltages to each facet 102(*a-f*) of each directional pixel 100. Processor 201 of the controller also controls a mechanical motion driver 206 that provides motor control signals to the motor or some other type of mechanism that controls the movement of display device 202. A memory 208 stores data structures representing a 3D scene that is to be displayed on display device 202. The 3D image that is to be displayed on display device 202 can also be stored in memory 208, and processor 201 having software operable thereon can deconstruct and quantize the image into an array of dots with direction, hue, and intensity and store the same as the data structure.

One skilled in the art would recognize that display device 202 can be created by any type of uniform or non-uniform, random arrangement of directional pixels 100, which directional pixels 100 can be of any geometric configuration. An important characteristic of the display device 26, however, is that the display device 202 is or appears to the observer as a solid volumetric display. Display device 202 could be implemented as a full volume of directional pixels 100, or implemented with one or more sub-groups of directional pixels 100 with the properties of each of the sub-groups of directional pixels 100 translated into an appropriate position with respect to the observer to create the desired stereoscopic image for the observer.

Furthermore, the point source of light emanating from each facet 102(*a-f*) can be generated in any manner, such as any type of LED or from a light source coupled to an optical fiber network for providing light to the optical fibers providing the point sources of light to each one of the facets 102 on each directional pixel 100 of the display device 202.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. An image display device, comprising: a three-dimensional array of directional pixels, wherein each directional pixel includes a plurality of facets each facet having a separate point source of light combined to each facet with each point source of light configured to emit light in a unique direction with a luminance and hue; and a controller operable for controlling each point source of light on each of the facets.

2. The image display device of claim 1, and further comprising a mechanism combined to the array of directional pixels operable to move the array of directional pixels within a volume of space to provide a 3D Image.

3. The image display device of claim 2, wherein the mechanism dithers a movement of the array of directional pixels in order to remove an edge-artifact in the 3D Image.

4. The image display device of claim 1, wherein the array of directional pixels has a space between each of the adjacent directional pixels so that each of the facets on each of the directional pixels is generally unobstructed.

5. The image display device of claim 4, wherein the space between each of the directional pixels is substantially equal to a volume of the directional pixel.

6. The image display device of claim 1, wherein each directional pixel has 6 facets arranged in a cubical configuration.

7. The image display device of claim 6, wherein the array of directional pixels are arranged in a chequered pattern with a space between each directional pixel.

8. The image display device of claim 7, wherein the mechanical mechanism oscillates the array of directional pixels.

9. The image display device of claim 7, wherein the mechanical mechanism dithers a movement of the array of directional pixels in order to remove an edge-artifact in a 3D image.

10. The image display device of claim 1, wherein the point source of light includes light generated from at least one chosen from a group including a light emitting diode, a laser diode, and an optical fiber carrying light from a common light source.

11. The image display device of claim 1, wherein each point source of light can emit a red, green, and blue light.

12. The image display device of claim 1, wherein the facet on each of the directional pixels has a normal vector, wherein the normal vectors of each of the facets on the directional pixel are at an angle with respect to each other.

13. The Image display device of claim 12, wherein at least one of the normal vectors has a component vector in an x, y, and z direction.

14. The image display device of claim 1, wherein each point source of light is controlled independently by the controller.

15. The image display device of claim 2, wherein the constrained viewing angle of each one of the plurality of facets provides a variable distance between each of the plurality of facets and an observer which creates a depth between each of the plurality of facets to create a stereoscopic display.

16. The image display device of claim 1, wherein the point source of light emits light with a polarization property that is controlled by the controller.

17. The image display device of claim 1, wherein the mechanical mechanism moves the array of directional pixels in order to provide stereoscopic depth perception to an observer.

18. A method for displaying a three-dimensional (3D) image, comprising: arranging a three-dimensional array of directional pixels, wherein each directional pixel, includes a plurality of facets with each facet having a separate point source of light for emitting a light in a unique direction; and independently controlling a luminance property and a hue property of the light emitted from each facet.

19. The method of claim 18, wherein each facet of each directional pixel has a normal vector, and positioning each facet on the directional pixel at an angle with respect to the normal vector of the other facets on the directional pixel.

20. The method of claim 19, arranging the plurality of directional pixels in a 3D volume of space.

21. The method of claim 20, and further comprising providing a stereoscopic image to an observer.

22. The method of claim 19, and further comprising arranging the plurality of directional pixels in a two-dimensional (2D) array pattern, moving the directional pixels, and providing to an observer a display having an appearance of a 3D volume of space.

23. The method of claim 22, and further comprising providing a stereoscopic image to an observer.

24. The method of claim 23, and further comprising interlacing spaces between the directional pixels.

25. The method of claim 23, and further comprising interlacing spaces between the directional pixels in a ratio of 1 space to 1 directional pixel.

26. The method of claim 18, and further comprising independently controlling a polarization property of the light emitted from each facet.

27. The method of claim 18, and further comprising digitizing an image into an array of dots each dot represented by a direction, a hue, and an intensity.

28. The method of claim 27, and further comprising translating the array of dots to corresponding directional pixels for viewing by an observer on a display device.

29. An image display device, comprising: a three-dimensional array of directional pixels, wherein each directional pixel includes a plurality of facets each facet having a separate point source of light combined to each facet with each point source of light emits light in a unique direction with a luminance property and a hue property; a controller operable for controlling each the luminance property and the hue property of the light emitted from the point source of light on each of the facets; and a mechanism combined to the array of directional pixels to move the directional pixels with respect to an observer to provide a stereoscopic image to the observer.

30. The image display device of claim 29, wherein each point source of light emits light with a polarization property, and wherein the controller is operable for controlling the polarization property of the light emitted from the point source of light on each of the facets.

31. The image display device of claim 30, wherein the array of directional pixels is interlaced with a space between each adjacent directional pixel.

32. The image display device of claim 31, wherein a ration of a dimension of the space and the directional pixel is greater than 1 space to 1 directional pixel.

33. The image display device of claim 29, wherein each directional pixel defines a volume of space and the plurality of facets are oriented to surround the volume of space.

* * * * *